Figure 11:
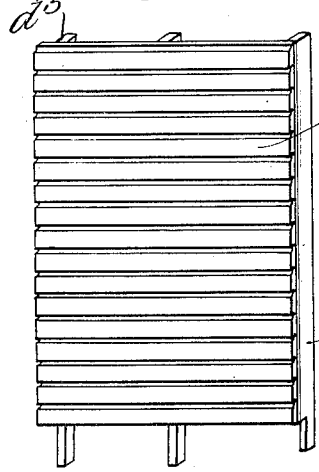

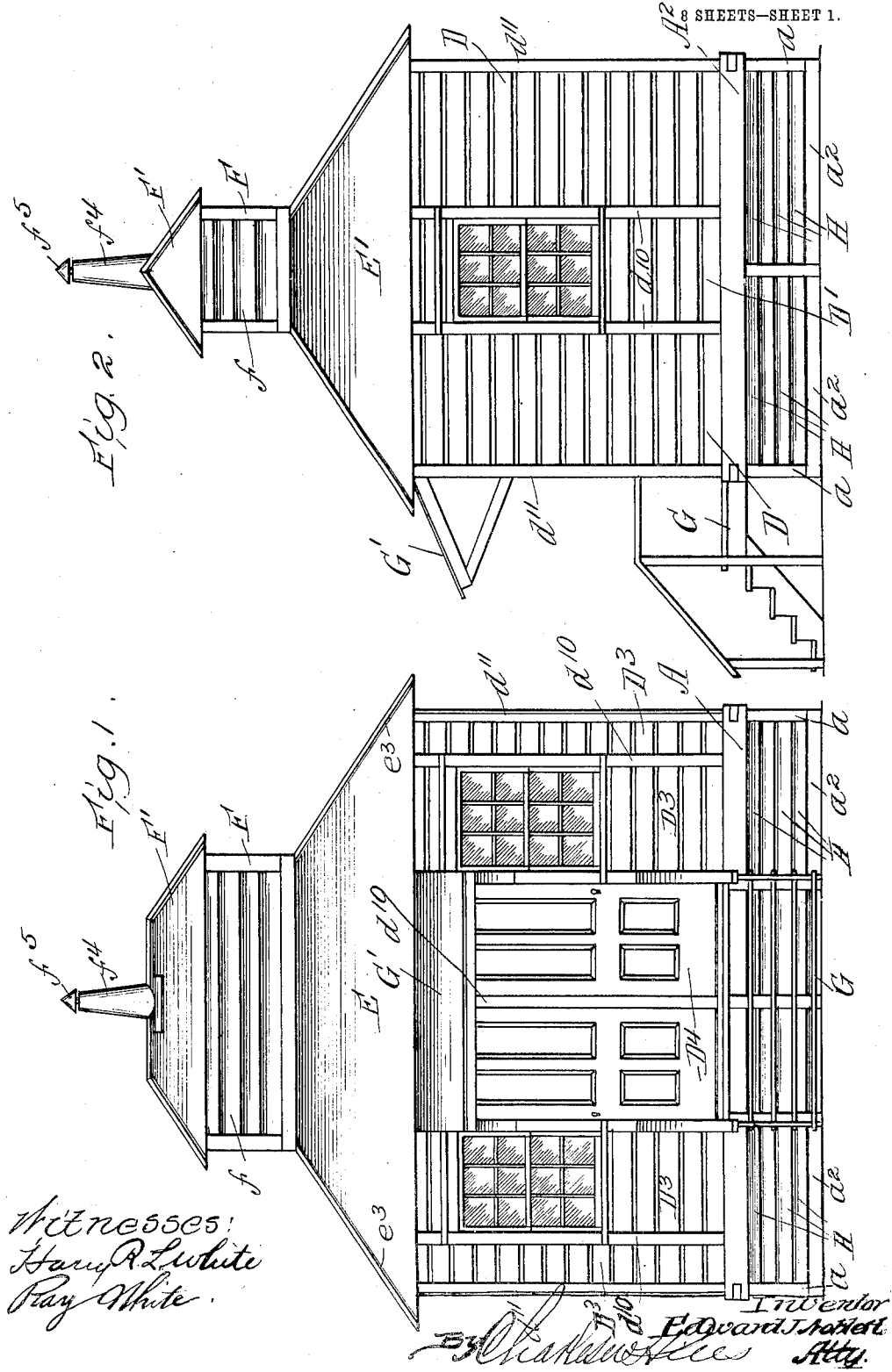

No. 827,030. PATENTED JULY 24, 1906.
E. J. NOBLETT.
SANITARY HOUSE.
APPLICATION FILED MAR. 25, 1905.
8 SHEETS—SHEET 2.
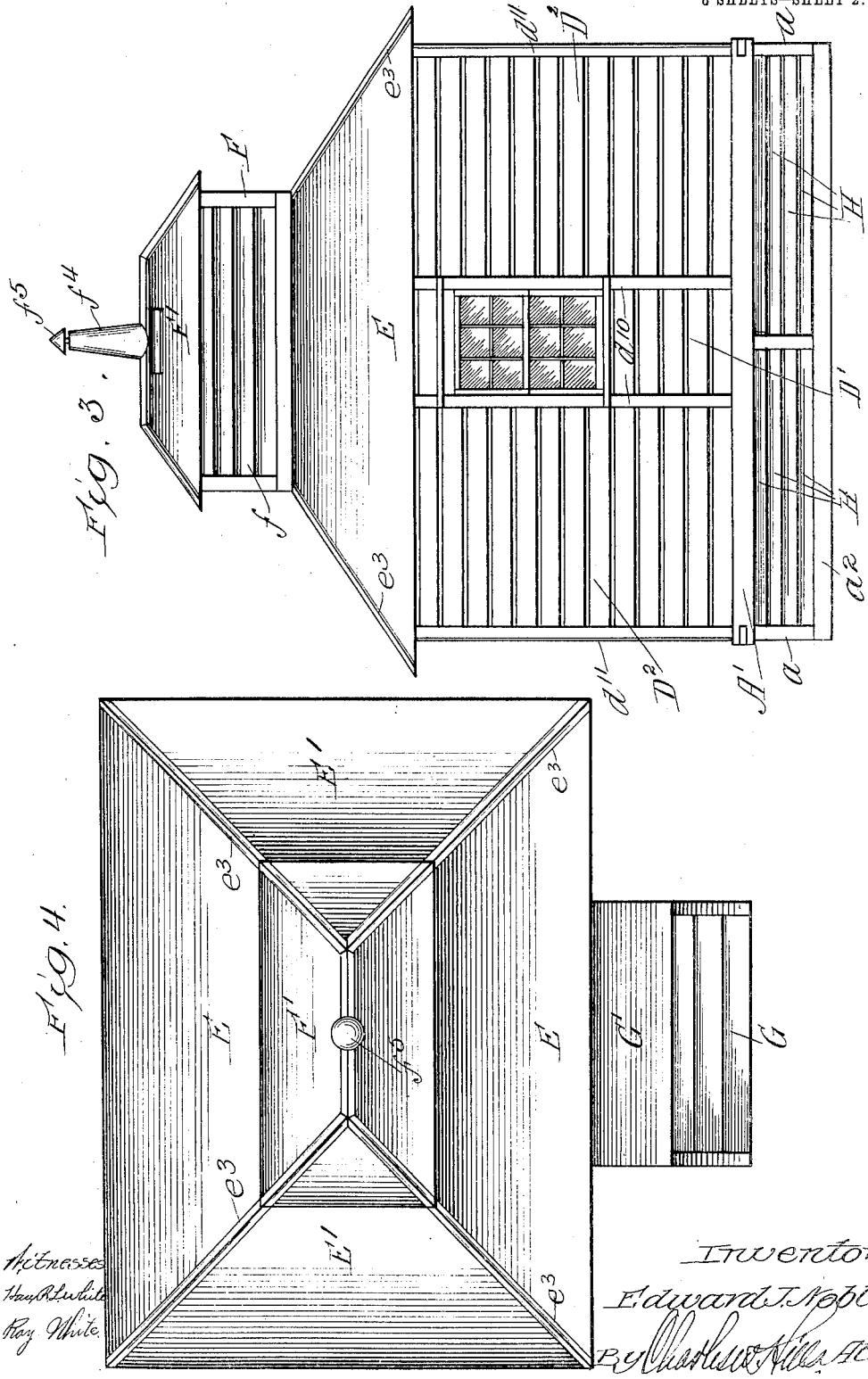

No. 827,030. PATENTED JULY 24, 1906.
E. J. NOBLETT.
SANITARY HOUSE.
APPLICATION FILED MAR. 25, 1905.
8 SHEETS—SHEET 3.
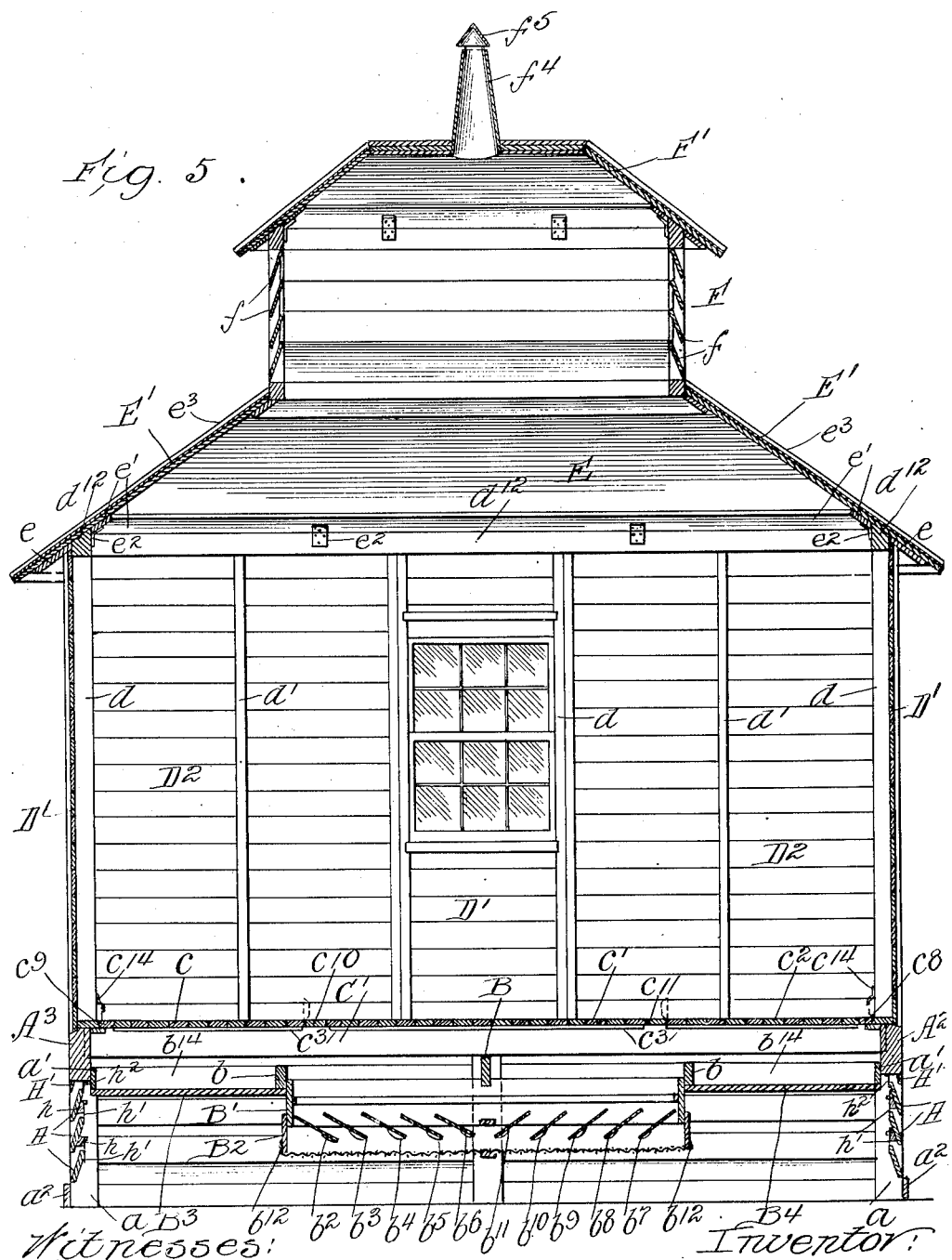

No. 827,030. PATENTED JULY 24, 1906.
E. J. NOBLETT.
SANITARY HOUSE.
APPLICATION FILED MAR. 25, 1905.
8 SHEETS—SHEET 4.
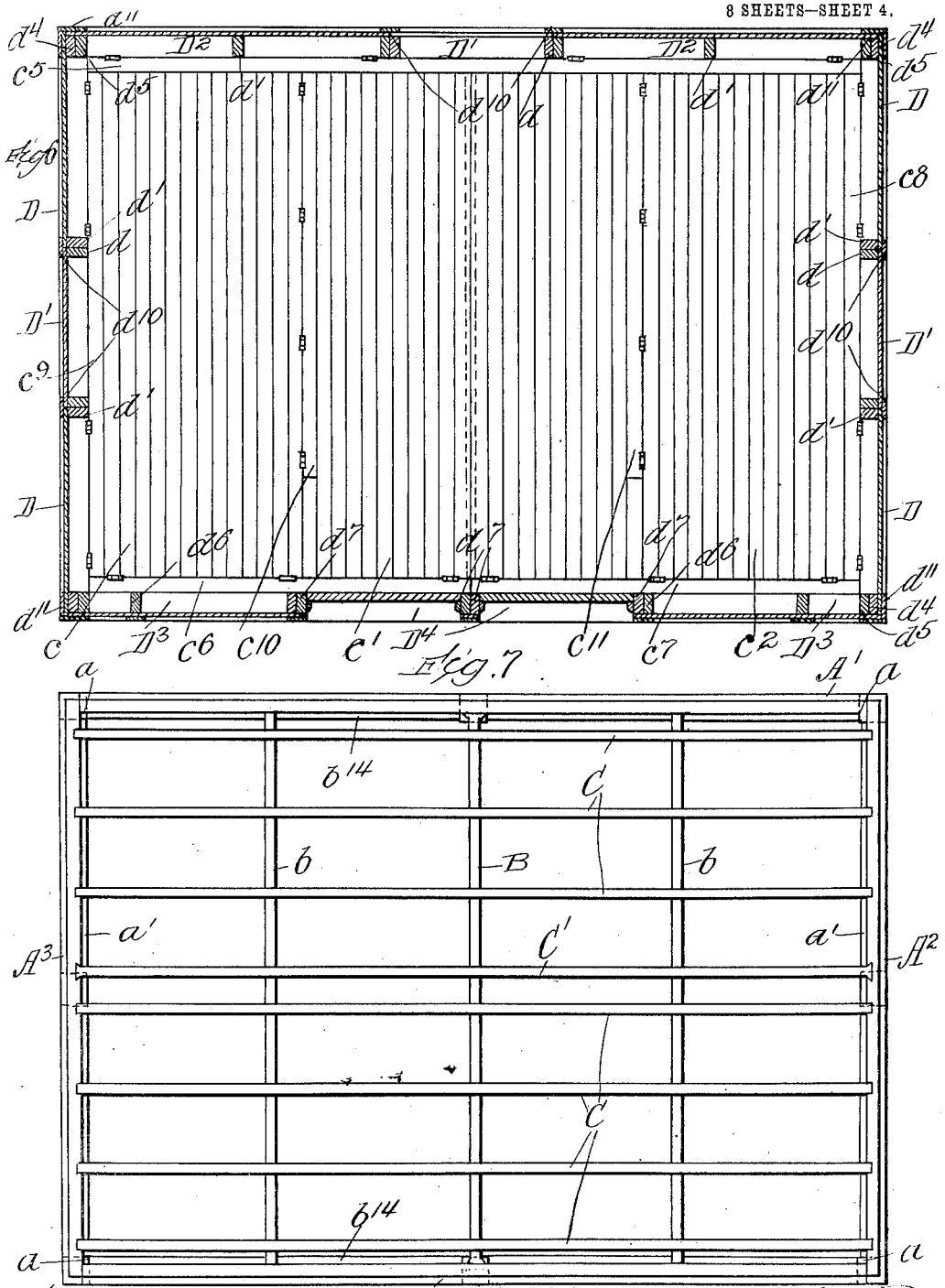

No. 827,030. PATENTED JULY 24, 1906.
E. J. NOBLETT.
SANITARY HOUSE.
APPLICATION FILED MAR. 25, 1905.
8 SHEETS—SHEET 5.
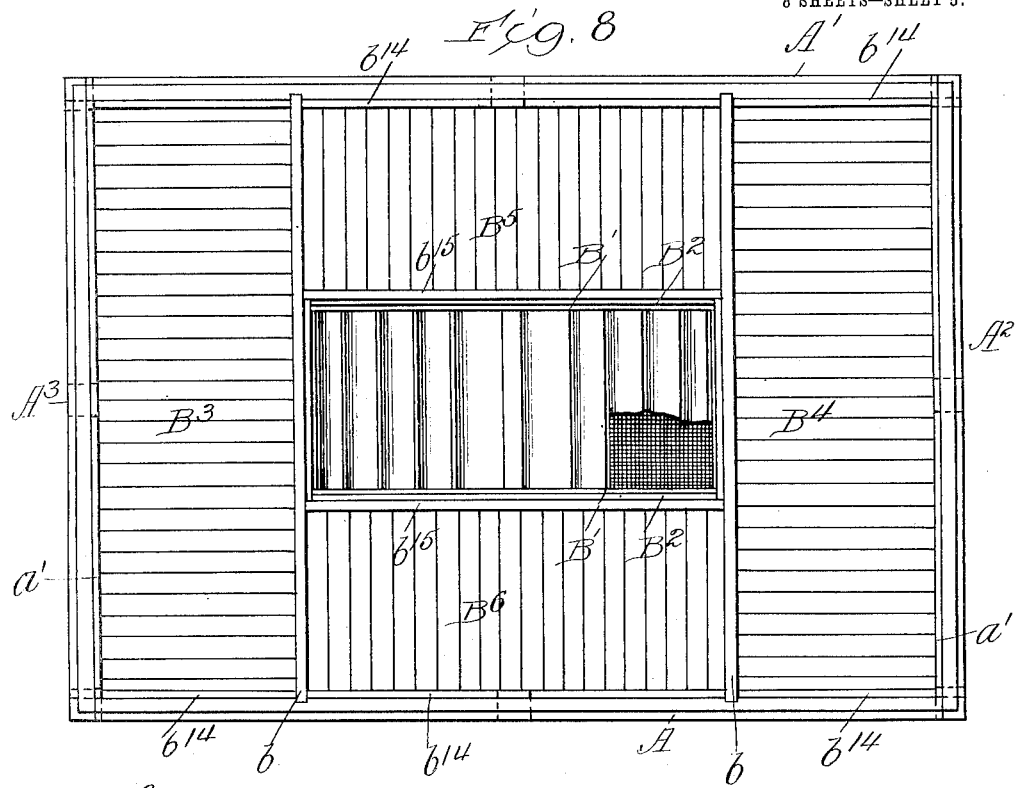
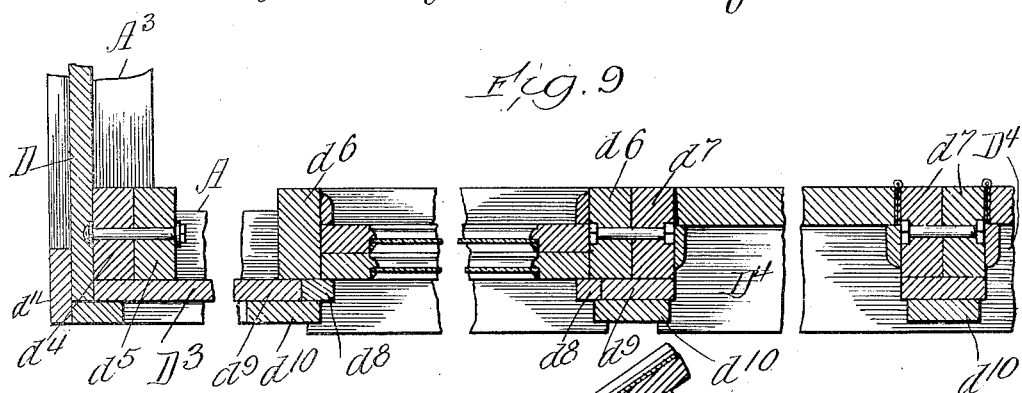
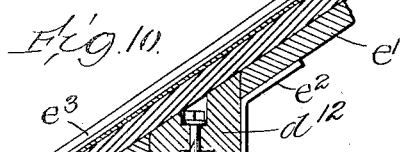
Witnesses
Harry R. L. White
Ray White
Inventor:
Edward J. Noblett
By Charles W. Hills, Atty No. 827,030. PATENTED JULY 24, 1906.
E. J. NOBLETT.
SANITARY HOUSE.
APPLICATION FILED MAR. 25, 1905.

8 SHEETS—SHEET 6.

Witnesses:
Harry R. Leolute
Ray White.

Inventor:
Edward J. Noblett.
By Charles W. Hills, Atty.

No. 827,030. PATENTED JULY 24, 1906.
E. J. NOBLETT.
SANITARY HOUSE.
APPLICATION FILED MAR. 25, 1905.
8 SHEETS—SHEET 7.
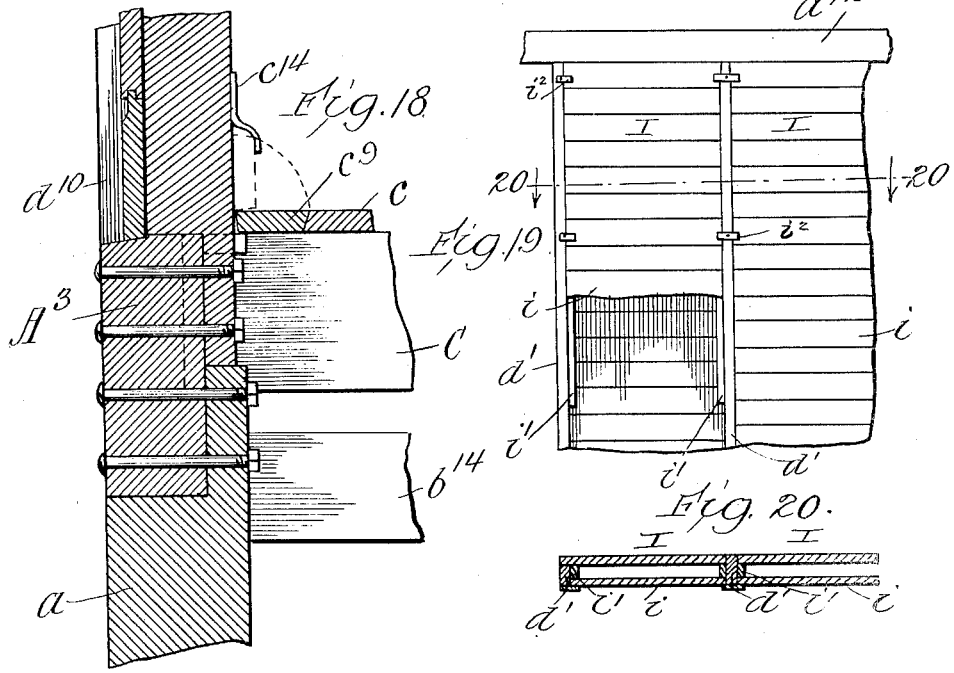
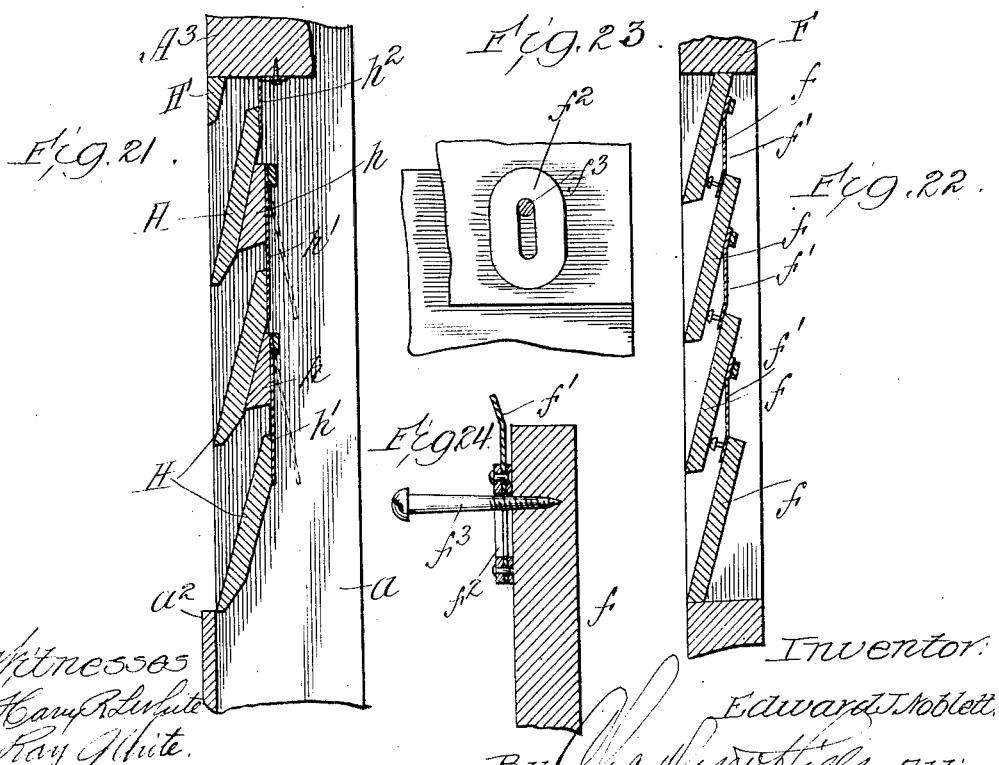
Witnesses
Inventor:
Edward J. Noblett.
By Charles Hill, Atty.

No. 827,030. PATENTED JULY 24, 1906.
E. J. NOBLETT.
SANITARY HOUSE.
APPLICATION FILED MAR. 25, 1905.

8 SHEETS—SHEET 8.

Witnesses:
Harry R. L. White
Ray White

Inventor:
Edward J. Noblett
By Charles D. Hicks, Atty.

UNITED STATES PATENT OFFICE.

EDWARD J. NOBLETT, OF CHICAGO, ILLINOIS.

SANITARY HOUSE.

No. 827,030.

Specification of Letters Patent.

Patented July 24, 1906.

Application filed March 25, 1905. Serial No. 251,956.

*To all whom it may concern:*

Be it known that I, EDWARD J. NOBLETT, a citizen of the United States, and a resident of the city of Chicago, in the county of Cook and State of Illinois, have invented certain new and useful Improvements in Sanitary Houses; and I do hereby declare that the following is a full, clear, and exact description of the same, reference being had to the accompanying drawings, and to the letters of reference marked thereon, which form a part of this specification.

This invention relates to sanitary houses, and more particularly to a house adapted for use in the treatment of tuberculous and other pulmonary diseases and affections.

For many years it has been a well-known and the best approved method for treating pulmonary affections to require the patient to sleep in the open air, preferably in a climate where the variations in temperature and humidity are not so extreme as to greatly tax the patient. In many instances, however, tuberculous camps have been established—as, for instance, in the Adirondack regions, in certain parts of Canada, and in numerous other places where the patient is exposed to the rigors of a severe winter season—and the only shelter afforded in many instances is a tent. It is the experience of experts in pulmonary diseases that the patient is sometimes gravely endangered by exposure to sudden changes which frequently tax the low vitality of the patient beyond the power of recuperation. The objects sought by these methods of treatment are to insure the patient obtaining pure and uncontaminated air, not necessarily cold air, and certainly it is not desirable to unduly expose the health of the already-debilitated patient to the hardships incurred in sleeping out of doors without adequate protection.

The object of this invention is to afford a house of light, strong, and durable construction and insuring perfect sanitary conditions as to ventilation at all times and while protecting the inmate from dampness and enabling the patient to employ the ordinary means for securing warmth and comfort to provide at all times independent of weather conditions a regulable supply of pure outside air without exposing the patient to draft.

It is a further object of the invention to afford a construction whereby the air constantly circulates and flows through the building or house and affords means whereby the supply of air is practically invariable, the construction automatically operating to regulate the amount of air received during high winds to approximately the amount of air received when a gentle breeze is blowing.

It is a further object of the invention to afford a sectionally-built house and one which the patient can remove from place to place at will, thus enabling the patient to obtain variety of scenery from time to time and change of climate and such local conditions as he may prefer and his physician may advise.

The invention embraces many novel features; and it consists in the matters hereinafter described, and more fully pointed out and defined in the appended claims.

Figure 12:
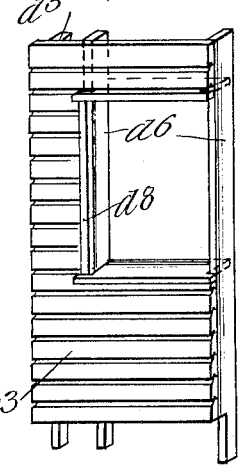
Figure 13:
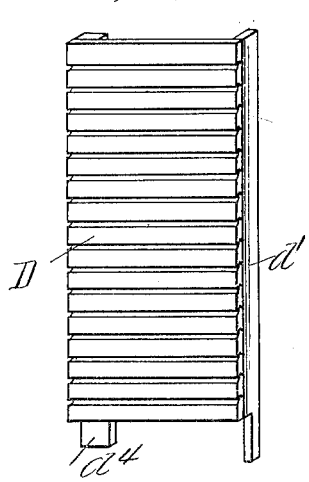
Figure 14:
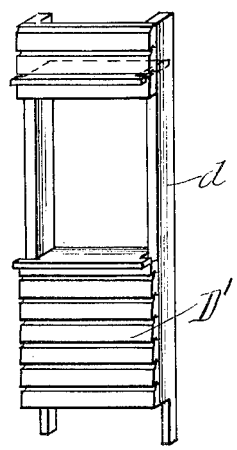
Figure 15:
Figure 16:
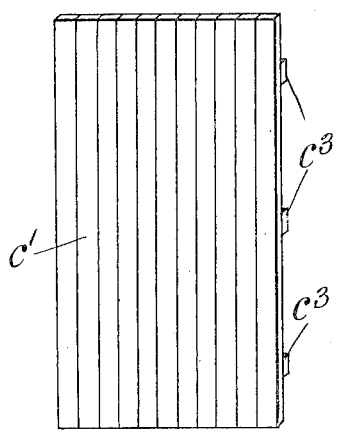
Figure 17:
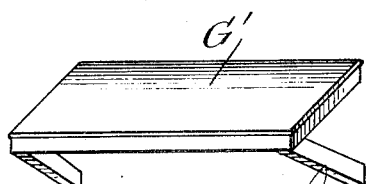
Figure 28:
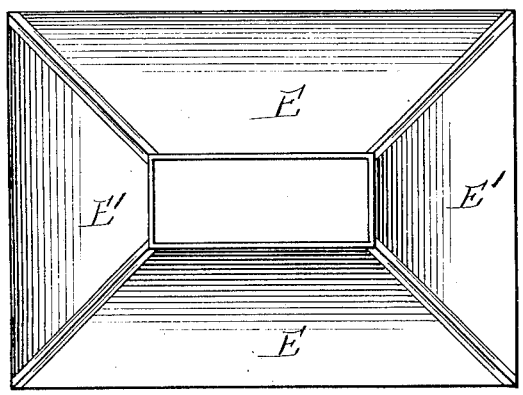
Figure 29:
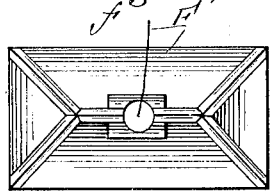
Figure 27:
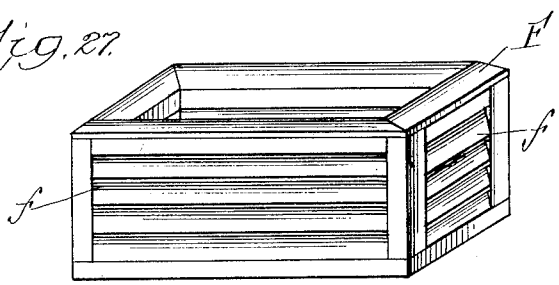
Figure 26:
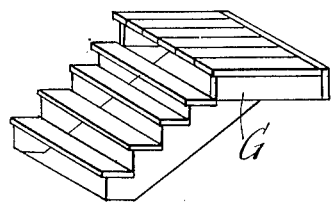
Figure 25:
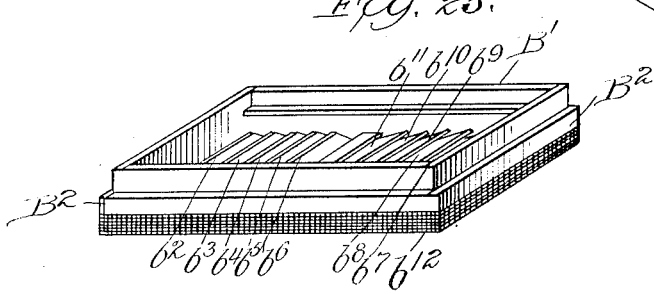

In the drawings, Figure 1 is a front elevation of a house embodying my invention. Fig. 2 is an end elevation of the same. Fig. 3 is a rear elevation thereof. Fig. 4 is a top plan view of the same. Fig. 5 is a central longitudinal section. Fig. 6 is a horizontal section taken just above the floor. Fig. 7 is a plan view of the framing and joists for the sills and floor. Fig. 8 is a horizontal section, partly broken, taken between the floor and the subfloor. Fig. 9 is an enlarged fragmentary horizontal section illustrating the frame and the door and window construction. Fig. 10 is an enlarged fragmentary detail illustrating the method of attaching the roof to the walls. Fig. 11 is a perspective view of one of the side sections. Fig. 12 is a similar view of a window-section used adjacent the door. Fig. 13 is a similar view of a relatively narrow section of the front side wall. Fig. 14 is a perspective view of a window used at the ends of the house. Fig. 15 is a similar view of one of the door-sections. Fig. 16 is a perspective of one of the floor-sections. Fig. 17 is a perspective view of the porch. Fig. 18 is an enlarged fragmentary detail illustrating the method of securing the sills to the posts. Fig. 19 is a fragmentary detail illustrating means for lining the sections on the inner side, if preferred. Fig. 20 is a section taken on line 20 20 of Fig. 19. Fig. 21 is an enlarged fragmentary detail illustrating the arrangement of louvers, whereby air is admitted beneath the subfloor. Fig. 22 is a similar detail of the arrangement and construction of louvers, whereby the air is permitted to escape from the top of the house. Figs. 23 and 24 are enlarged details of the construction of the louvers shown in Fig. 22. Fig. 25 is a perspective view of the louver-frame and regulating-louvers in the subfloor. Fig. 26 is a perspective view of the step-section. Fig. 27 is a perspective of the top ventilator-section. Fig. 28 is a top plan view of the roof of the house. Fig. 29 is a top plan view of the roof of the ventilator.

In said drawings, A and A' indicate the side sills, and $A^2$ and $A^3$ the end sills, which, as shown, comprise four-by-ten dimension-pieces of the required length, mortised together at their ends, and to which are rigidly bolted the posts $a$, the number of which will of course vary with the dimension of the house, but which in the drawings are shown to be eight in number and of equal length. Said posts, as shown, are cut to fit under the sills and lap on the inner side thereof and afford a flush finish on the outer side. A base-strip $a^2$ of any desired width is secured on the outer side and at the foot of said posts, thus rigidly binding the same together.

Secured on the inner side of the side sills for the entire length and extending below the same are strips $b^{14}$, and secured thereon at their ends transversely of the house are subjoists $b$ at equal distances between the ends and middle of the building, and extending transversely at the center and dovetailed into the middle post on each side of the house is a stringer B, the bottom of which extends in a plane with the under side of the subjoists $b$ and strips $b^{14}$ and the top of which affords a center support for the floor-joist C' of the building.

Secured longitudinally of the building and centrally between the subjoists $b$ is a rectangular louver-frame in itself comprising a section when the house is built sectionally and consisting of an inner frame B', which is secured to the subjoists and extends below the same and fits into a lower outer frame $B^2$, in which and pivotally secured near their axis are flights or louver-boards $b^2$ to $b^{11}$, inclusive, which, as shown, incline oppositely from the middle, so that though all remain in their fully-open position when the wind is very light a stronger wind acts to partly close some of said louver-boards, which are each preferably weighted to close at different pressures, so that with a strong wind only a sufficient open space is left to afford the requisite amount of circulation. Covering the bottom of the underframe $B^2$ is a fine-wire screen $b^{12}$, which acts to shut out insects and vermin. Said subjoists are sheathed with matched lumber or other suitable material acting to afford close joints on their under side, affording a subfloor, and, as shown, said subfloor is constructed in sections, (indicated in Fig. 8 by $B^3$, $B^4$, $B^5$, and $B^6$,) of which the sections $B^3$ and $B^4$ are secured to the subjoists and to strips $a'$ on the end sills similar to the strips $b^{14}$, and the sections $B^5$ and $B^6$ are secured on the strips $b^{14}$, secured to the side sills, and $b^{15}$, secured to the louver-frame. Said sections being rigidly bolted or screwed in place on the sills, subjoists, and louver-frame afford a tight subfloor with the louver positioned in the middle of the same.

Resting upon the stringer B and gained into the end sills are joists C and a center joist C', the ends of which are dovetailed into the middle posts at the end of the house, as shown in Fig. 7, and act to tie the end sills centrally in the same manner that the cross-stringer B ties the side sills centrally. Supported on said joists is a floor consisting, as shown, of three sections $c$, $c'$, and $c^2$, each comprising a closely-laid floor of suitable tongue-and-grooved strips secured together by battens $c^3$, whereby said sections may be handled as units in the building or taking down of the house. As shown, extending along each side wall and each end wall of the house are strips $c^5$ $c^6$ $c^7$ $c^8$ $c^9$, which form a part of the floor when down, of which $c^5$ $c^8$ $c^9$ are hinged to turn back against the side and end walls, respectively, and $c^6$ and $c^7$ are hinged to turn back upon the floor. Said strips afford an air-inlet space at each side and at each end for the full length and width of the room and through which the air admitted through the louver-frame in the subfloor passes. As shown, also, each of the sections $c$ and $c^2$ have hinged thereto at their inner edge an upwardly-folding section $c^{10}$ and $c^{11}$, adapted to permit the inflow nearer the middle of the room and ordinarily in close proximity with the bedside should said hinged section be opened at night.

As shown, the side and end walls are each composed of sections adapted to be bolted together to afford a very rigid construction. Said sections are each constructed of dimension stuff, such as two-by-four pine or other suitable material, dressed to afford a satisfactory interior finish and having secured on the outer side thereof matched siding to afford as great strength as possible and to render the same a satisfactory protection against wind and weather. The top outer edge of the sill is beveled downwardly and outwardly to shed water, and the lower end of the studding for each of said side and end sections is cut to lap onto the inner side of the sill, to which it is rigidly bolted, thus bringing the outer face of the siding back slightly from the outer face of the sill to admit of a casing $d^{10}$, covering the joint between adjacent sections flush with the outer side of the sill.

As shown, three sections, comprising two duplicate plain sections D D and a central window-section D', form each end of the house and are rigidly secured in place each to the other by bolting the studding $d$ of the window-sections and $d'$ of the plain sections together and to the sill. In the same manner the rear side of the building is constructed of two plain sections, being indicated by D², and a window-section corresponding with the end window-sections D' before described.

Conveniently, the sections are bolted together at the corners, as shown in Fig. 9, the studding $d^4$ being secured flat to the siding of the section D and the stud $d^5$ of the section D² at the rear of the house being set back the thickness of the stud $d^4$, so that in bolting said studs together a double corner-stud is provided, which greatly increases the strength. The front wall of the building consists of two end sections D³, similar in construction and each containing a window, one stud $d^5$ of which bolts to the stud $d^4$ of the corresponding end section D and the other stud $d^6$ of which serves as a window-jamb and bolts to the corresponding stud $d^7$, which serves as a jamb for the door-section D⁴, of which, as shown, there are two, the adjacent studs of which bolted together afford a double thickness between the doors when in place, as shown in Fig. 9.

As shown, a blind-stop $d^8$ is rigidly secured on the outer face of each window-stud, and a corresponding furring-strip $d^9$ covers the joints between all connected studs, and a casing $d^{10}$ is secured covering each joint and finishing flush with the sill, as before described. In the same manner corner-boards $d^{11}$ are provided, affording a finished corner. Connecting the tops of said sections are the plates $d^{12}$, into which the upper ends of each stud mortises and through which and extending through the tenon of the studs extend wood-screws $d^{13}$, which firmly bind the plates in place.

The upper edge of the plate is beveled to correspond with the pitch of the roof, and supported on said plates is a hip-roof having a central opening and comprising four sections of appropriate shape, the side sections of which are indicated by E and the end sections by E'. Said roof is constructed of matched boards or other suitable material having a covering thereon of canvas or felt, painted or treated in any suitable manner to render the same waterproof. On the under side of each section are secured cleats $e$ and $e'$, spaced a distance apart to afford a groove between the same, in which the plate fits and to which the roof is secured by means of metallic brackets $e^2$, which are rigidly secured both to the plate and the cleat $e'$, as shown in Fig. 10. Hip-boards $e^3$ cover the joints in said roof and are rigidly secured thereto and act to bind the sections together for the entire length of each joint. Removably secured to cover the opening at the center of the hip-roof is a ventilator F, comprising four louver-frames rigidly secured together at the corners to afford a rectangular ventilator extending a height above the roof to provide, as shown, four rigidly-secured louver-boards in each frame and affording spaces between the same for the passage of air. As shown, secured on the inner face of each of said louver-boards $f$ and depending downwardly into the opening between the lower edge of the same and the next succeeding lower louver-board is a flap $f'$, of leather, canvas, or other suitable material, which, as shown, is provided with eyelets $f^2$, worked along its margin and into which extends a pin or screw $f^3$, the head of which bears against the outer edge of the next upper louver-board and acts to confine said flap from being drawn out of operative relation by the force of the draft. Removably secured on the top of the ventilator is a roof F', also hipped and from the center of which opens an upwardly-extending flue $f^4$, the upper end of which is protected with a cowl $f^5$, of any suitable type, as is usual.

On the front of the house leading to the doors are the steps G, also made to constitute a separate section, and, if preferred, a porch-roof G' may be secured above the doors in any suitable manner, as shown in Figs. 1 and 2. Inwardly-opening louvers are provided between the posts $a$, affording the foundation of the house. These louvers, as shown, are rigidly secured to the posts $a$, and each of the same (indicated by H) is provided with a block $h$ on the rear side of the same, affording a flat perpendicular face on which is rigidly secured a depending flap $h'$, of canvas, leather, or other suitable material, which hangs down over the inner side of the next succeeding louver-board, as shown in Fig. 21, and acts to close the opening of the louver-boards against pressure from within, but affords free inlet for the air flowing inwardly. As shown, the uppermost of said louver-boards H' is secured on the under side of the sill and is comparatively narrow, and the uppermost of said flaps (indicated by $h^2$) is secured beneath the sill and hangs down over the next succeeding louver-board, as before described.

If preferred, an inner lining for the walls may be provided, as shown in Figs. 19 and 20, comprising sections I I, of sheathing $i$, cut to fit transversely between the studding and matched together, if preferred, and secured on their inner sides by strips $i'$ of a width such that when they are in contact with the outer wall the lining will be flush with the inner faces of the studding. Buttons $i^2$ are pivotally engaged on said studding and when in one position engage the sides of said sections and hold them in place.

The operation is as follows: The house constructed as described is of light weight and capable of ready transportation and to be quickly assembled in erecting the same or to be taken apart for moving. If preferred, a partition extends from the double studs transversely the house, as shown in dotted lines in Fig. 6, dividing the same into two equal rooms each having an individual door, which in that case may open back against the partition. Either a stove or any preferred method for heating may be used, and after the room or rooms are at the proper temperature the patient swings back the hinged sections $c^5$, $c^6$, $c^7$, and $c^8$, fastening the same against the wall by means of the hooks $c^{14}$, secured on the studs in position to engage said hinge-sections when fully opened. It is obvious that fresh air circulates through the entire room at all times, inasmuch as the wind blowing against any side or end of the house passes inwardly through the lower louvers on the windward side, closing these on the other side, and passes upwardly through the louvers in the subfloor, where it is distributed, and into the room through the openings afforded by said hinged sections. After circulating in the room, the current passing outwardly, a part passes through the central flue at the top of the ventilator and the remainder passes outwardly through the louvers in the leeward side of the ventilator. This will be obvious, inasmuch as the pressure of the wind against the ventilator-louvers on the windward side of the house tends to hold the same firmly closed, while in the same manner the pressure from within below the subfloor acts to hold the louvers on the leeward side of the house firmly closed, and inasmuch as the regulating louver-boards in the subfloor are weighted to balance at different pressures the quantity of air delivered into the room is thus automatically regulated in part by the pressure of the wind.

Obviously a sectional house capable of being assembled and affording a perfect system of ventilation is particularly adaptable for patients affected with pulmonary diseases owing to the facility with which the patient can obtain change of climate and scenery with trifling expense.

Obviously many details of construction may be varied, and, if preferred, the ventilating system can be applied to buildings and houses of any desired construction. I do not desire to limit this application for patent otherwise than necessitated by the prior art, as the form and details of construction of the house may be varied to suit the individual taste of the purchaser, and the particular embodiment of the ventilating devices may be varied without departing from the principles of this invention.

I claim as my invention—

1. A ventilated room comprising a floor, walls and a roof, means admitting air beneath the floor upon the windward of the room and hinged sections in the floor arranged around the walls of the room opening upwardly and admitting the air through the floor and ventilators at the top of the room from which the air flows outwardly.

2. A ventilated room comprising means admitting of a natural draft of air therethrough comprising inwardly-open valves adapted to admit air beneath the floor, valves in the floor adjacent the walls admitting the air into the room, and outwardly-opening valves at the top of the room.

3. A room adapted to be ventilated by natural draft, comprising a floor, side walls and roof, inwardly-opening valves beneath the floor, outwardly-opening valves at the roof and an apertured floor whereby the air flows inwardly from the windward side of the house beneath the floor and outwardly at the leeward side of the house and the roof.

4. A house comprising the floor, walls and a roof, inwardly-opening valves beneath the floor, hinged sections at the floor adjacent the walls through which the air flows into the room and outwardly-opening valves in the roof whereby the air flows from the windward side of the house upwardly therethrough and out at the leeward side thereof.

5. In a house the combination with the walls, floor and roof thereof, of a subfloor below the floor, upwardly-opening regulating-valves arranged in the subfloor and adapted to close at different degrees of pressure from below, valves opening inwardly through the walls below the subfloor, valves in the floor adapted to be opened to admit the air therethrough and outwardly-opening valves in the roof.

6. A sanitary house comprising the walls, roof floor and subfloor, a base-wall elevating the subfloor above the ground, louvers arranged in the base-wall below the subfloor, flexible flaps depending on the inner side of the same permitting the air to flow inwardly only, upwardly-opening regulating-valves in the subfloor normally open and adapted to be closed at different pressures from below, hinged floor-strips and louver-boards in the roof arranged to permit outflow of air only.

7. A house having apertures in the floor and supported above the ground, valves opening inwardly beneath the floor, valves opening outwardly at the top of the house and a plurality of differently-weighted pivoted louver-boards beneath the floor normally open and adapted to be closed at different air-pressures and controlling the admission of air through the floor.

8. A sectionally-built house having apertures in the floor and supported above the ground, valves opening inwardly beneath the floor, valves opening outwardly at the top of the house and a plurality of differently-weighted pivoted louver-boards beneath the floor normally open and adapted to be closed at different air-pressures and controlling the admission of air through the floor.

9. A house having apertures in the floor and supported above the ground, valves opening inwardly beneath the floor, valves opening outwardly at the top of the house and a plurality of differently-weighted pivoted louver-boards beneath the floor normally open and adapted to be closed at different air-pressures, controlling the admission of air through the floor and a wire screen covering the frame for the louver-boards.

10. In a sectionally-built house having upwardly-opening valves in the floor, valves arranged in the foundation of the house and opening inwardly by wind-pressure beneath the floor, means distributing the air beneath the floor and affording a uniform draft upwardly around the walls and outwardly-opening valves at the top of the house each comprising a plurality of louver-boards arranged at the sides of the roof and flaps acting to close the openings between the louver-boards by inward pressure.

11. In a sectionally-built house, the combination with the roof, the walls and a floor having openings therein arranged around the walls, of hinged closures for said openings in the floor, a subfloor, regulating-valves in the subfloor, louver-boards arranged in the foundation at the four sides of the house and affording inwardly-opening valves beneath the subfloor, a ventilator at the top of the house and louver-boards arranged on the four sides of the ventilator and affording outwardly-opening valves whereby circulation and supply of fresh air within the house is afforded by wind-pressure.

12. In a house of the class described a foundation, louver-boards arranged therein and inclined at their outer sides downwardly, and depending flaps of flexible material supported on the inner side of each louver-board and depending below the upper edge of the next lower board and adapted to be swung inwardly by wind-pressure and to close by pressure outwardly.

13. In a sectionally-built house the combination with the foundation and sills detachably engaged thereon, of sets of louver-boards arranged in the foundation in sections, each set of louver-boards affording outwardly and downwardly inclined horizontal members affording an air-space between the same and a flap of flexible material supported on each louver-board and depending over the upper edge of the next lower board and adapted to swing inwardly by pressure from without and to close by pressure from within and affording valves at the four sides of the house.

14. In a sectionally-built house the combination with the foundation and the sills detachably engaged thereon, of sets of louver-boards arranged in the foundation in sections, each set of louver-boards affording outwardly and downwardly inclined horizontal members affording an air-space between the same, a flap of flexible material supported on each louver-board and depending over the upper edge of the next lower board and adapted to swing inwardly by pressure from without and to close from pressure within and affording valves at the four sides of the house, a subfloor and regulating and distributing means located in the subfloor adapted to regulate the amount and distribute the inflowing air beneath the floor.

15. In a house of the class described the combination with the roof, the walls, the apertured floor and a subfloor, of a centrally-arranged louver-frame in the subfloor, louver-boards pivoted therein and differently weighted to close at predetermined pressures from below but adapted to admit of an upward current of air therethrough and affording openings between said louver-boards varying with the upward pressure and a wire net covering the louver-frame.

16. In a sectional house of the class described, the combination with an apertured floor, the walls, the roof and a subfloor, of a centrally-arranged louver-frame in the subfloor, louver-boards pivoted therein and differently weighted at their lower edges and adapted to admit of an upward current of air therethrough, the openings between said louver-boards varying with the upward pressure and a wire net covering the louver-frame, said louver-frame with its louver-boards affording a section independently removable.

17. A house comprising side and end sections rigidly bolted together, a sectional floor having apertures arranged around the wall, hinged closures therefor, a sectional roof rigidly secured to the wall-sections, a ventilator having outwardly-opening valves therein and affording an independently-removable section, inwardly-opening valves beneath the house adapted together with said ventilator-valves to admit a continuons flow of air into and through the house by wind-pressure.

18. The combination with a house, of a ventilator thereon, comprising a plurality of louver-frames arranged at the four sides thereof, each louver-frame containing a plurality of rigidly-set downwardly and outwardly inclined louver-boards affording spaces between the same, flaps of flexible material secured at the inner edge of each louver-board depending between the same and the upper edge of the next lower louver-boards, eyelets at the lower edge thereof and pins extending through said eyelets and into one of said louver-boards affording outwardly-opening valves.

19. In a house of the class described, means admitting a constant supply of air beneath the house, hinged sections in the floor arranged around the walls of the house and adapted to admit of upward flow therethrough, a ventilator at the top of the house having outwardly-opening valves therein, said house being constructed of independent detachable sections, rigidly bolted each to each, the wall-sections comprising inwardly-facing studdings and a removable lining fitted between the studdings.

20. A ventilated house comprising a structure affording one or more rooms, inwardly and outwardly opening valves at the bottom and top thereof respectively and arranged on the four sides of the building, an apertured floor arranged above the inwardly-opening valves, hinged closures for the apertures therein, whereby when apertures are open, a continuous flow of air is afforded through the house and upward by wind-pressure.

21. In a sectionally-built house the combination with the side walls and roof thereof, of a floor having hinged sections about its margins and through its center, a foundation, ventilating-valves therein, a subfloor, weighted valves therein and automatically-operating valves in said roof.

22. In a sectionally-built house the combination with the walls constructed in sections, of a sectional roof therefor, means for removably engaging said roof-sections to the walls, downwardly and outwardly inclined louver-boards in said roof, flexible flaps between said boards and adapted to open by outward pressure, a floor, a subfloor beneath the same, weighted louver-boards in said subfloor, a foundation, louver-boards therein and rearwardly-opening flexible flaps thereon.

23. In a sectionally-built house the combination with the roof and side walls thereof, of downwardly and outwardly inclined louver-boards rigidly secured in said roof, a flexible flap engaged on the inner side of each and depending below the top of the next row of boards and provided with eyelets in the lower margins thereof, pins in the tops of said boards adapted to engage in said eyelets, a floor and means in said floor adapted to admit a regulable flow of air therethrough.

24. In a house the combination with the roof, floors and walls, of downwardly and outwardly inclined louver-boards rigidly engaged in said roof and walls, flexible flaps controlling the openings between said boards and regulable valves in the floor affording communication through the walls and roof.

25. The combination with the side walls and roof of a house, of a floor, a subfloor beneath the floor, hinged sections in said floor and valves in said roof and subfloor adapted to afford air-passages therethrough.

In testimony whereof I have hereunto subscribed my name in the presence of two subscribing witnesses.

EDWARD J. NOBLETT.

Witnesses:
H. S. RUDD,
W. W. WITHENBURG.